(12) United States Patent
Song et al.

(10) Patent No.: US 11,363,213 B1
(45) Date of Patent: Jun. 14, 2022

(54) MINIMIZING GHOSTING IN HIGH DYNAMIC RANGE IMAGE PROCESSING

(71) Applicant: QUALCOMM Incorporated, San Diego, CA (US)

(72) Inventors: Ki Sun Song, Seoul (KR); Yi-Chun Lu, San Diego, CA (US); Shang-Chih Chuang, San Diego, CA (US); Xiaoyun Jiang, San Diego, CA (US); Nyeongkyu Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/187,357

(22) Filed: Feb. 26, 2021

(51) Int. Cl.
*H04N 5/235* (2006.01)
*G06T 7/20* (2017.01)

(52) U.S. Cl.
CPC .......... *H04N 5/2355* (2013.01); *G06T 7/20* (2013.01); *G06T 2207/10144* (2013.01); *G06T 2207/20221* (2013.01)

(58) Field of Classification Search
None
See application file for complete search history.

(56) References Cited

U.S. PATENT DOCUMENTS 9,137,456 B2 * 9/2015 Wong .................. H04N 5/2355
11,094,039 B1 * 8/2021 Wong ........................ G06T 5/50
11,113,802 B1 * 9/2021 Sun .................... H04N 5/23222

* cited by examiner

*Primary Examiner* — James M Hannett
(74) *Attorney, Agent, or Firm* — Qualcomm Incorporated

(57) ABSTRACT

Methods, systems, and devices for minimizing ghosting in high dynamic range image processing are described. The method may include capturing from a sensor of the device a downscaled first frame of a first exposure length and a downscaled second frame of a second exposure length that is longer than the first exposure length, identifying a highlight region associated with the downscaled first frame and a motion region associated with the downscaled first frame and with the downscaled second frame, blending the motion region in accordance with determining whether at least a portion of the motion region overlaps the highlight region, and incorporating the blending of the motion region in a set of full resolution frames.

30 Claims, 10 Drawing Sheets

MINIMIZING GHOSTING IN HIGH DYNAMIC RANGE IMAGE PROCESSING

BACKGROUND

The following relates to image processing at a device, including minimizing ghosting in high dynamic range image processing.

Devices, such as smartphones, tablets, home security systems, automobiles, drones, aircrafts, etc. are widely deployed to collect various types of information, such as visual information. These devices may be configured with optical instruments that are configured to capture the visual information in the form of images or video, which may be stored locally or remotely. In some examples, an optical instrument may be an image sensor configured to capture visual information using photosensitive elements, which may be tunable for sensitivity to a visible spectrum of electromagnetic radiation. In some cases, to support in capturing the visual information, these devices may be configured with light sources that may illuminate target objects or target areas in a physical environment.

In some cases, when errors occur in frames captured by the optical instrument the frames may be discarded, resulting in a poor user experience.

SUMMARY

The described techniques relate to improved methods, systems, devices, and apparatuses that support high dynamic range image processing. Generally, the described techniques provide for the minimizing of ghosting artifacts in high dynamic range image processing. The described techniques may include capturing from a sensor of a device a downscaled first frame of a first exposure length and a downscaled second frame of a second exposure length that is longer than the first exposure length. The described techniques may include identifying a highlight region associated with the downscaled first frame and a motion region associated with the downscaled first frame and the downscaled second frame. The described techniques may include blending the motion region in accordance with determining whether at least a portion of the motion region overlaps the highlight region and incorporating the blending of the motion region in a set of full resolution frames.

A method for image processing at a device is described. The method may include capturing from a sensor of the device a downscaled first frame of a first exposure length and a downscaled second frame of a second exposure length that is longer than the first exposure length, identifying a highlight region associated with the downscaled first frame and a motion region associated with the downscaled first frame and with the downscaled second frame, blending the motion region in accordance with determining whether at least a portion of the motion region overlaps the highlight region, and incorporating the blending of the motion region in a set of full resolution frames.

An apparatus for image processing at a device is described. The apparatus may include a processor, memory coupled with the processor, and instructions stored in the memory. The instructions may be executable by the processor to cause the apparatus to capture from a sensor of the device a downscaled first frame of a first exposure length and a downscaled second frame of a second exposure length that is longer than the first exposure length, identify a highlight region associated with the downscaled first frame and a motion region associated with the downscaled first frame and with the downscaled second frame, blend the motion region in accordance with determining whether at least a portion of the motion region overlaps the highlight region, and incorporate the blending of the motion region in a set of full resolution frames.

Another apparatus for image processing at a device is described. The apparatus may include means for capturing from a sensor of the device a downscaled first frame of a first exposure length and a downscaled second frame of a second exposure length that is longer than the first exposure length, means for identifying a highlight region associated with the downscaled first frame and a motion region associated with the downscaled first frame and with the downscaled second frame, means for blending the motion region in accordance with determining whether at least a portion of the motion region overlaps the highlight region, and means for incorporating the blending of the motion region in a set of full resolution frames.

A non-transitory computer-readable medium storing code for image processing at a device is described. The code may include instructions executable by a processor to capture from a sensor of the device a downscaled first frame of a first exposure length and a downscaled second frame of a second exposure length that is longer than the first exposure length, identify a highlight region associated with the downscaled first frame and a motion region associated with the downscaled first frame and with the downscaled second frame, blend the motion region in accordance with determining whether at least a portion of the motion region overlaps the highlight region, and incorporate the blending of the motion region in a set of full resolution frames.

Some examples of the method, apparatuses, and non-transitory computer-readable medium described herein may further include operations, features, means, or instructions for generating a highlight map including one or more highlight regions identified in the downscaled first frame, where the one or more highlight regions include the highlight region and generating a motion map including one or more motion regions identified in the downscaled first frame and in the downscaled second frame, where the one or more motion regions include the motion region.

Some examples of the method, apparatuses, and non-transitory computer-readable medium described herein may further include operations, features, means, or instructions for analyzing coordinates of the one or more highlight regions in relation to coordinates of the one or more motion regions and determining, in accordance with the analyzing, that at least the portion of the motion region overlaps the highlight region.

Some examples of the method, apparatuses, and non-transitory computer-readable medium described herein may further include operations, features, means, or instructions for generating a refined highlight map by adding at least the portion of the motion region that overlaps the highlight region to the highlight map and generating a refined motion map by removing at least the portion of the motion region that overlaps the highlight region from the motion map.

In some examples of the method, apparatuses, and non-transitory computer-readable medium described herein, the set of full resolution frames includes a first full resolution frame captured at the first exposure length and a second full resolution frame captured at the second exposure length.

Some examples of the method, apparatuses, and non-transitory computer-readable medium described herein may further include operations, features, means, or instructions for detecting a second highlight region of the first full resolution frame based on the refined highlight map and blending the detected highlight region of the first full resolution frame into a portion of the first full resolution frame that surrounds the detected highlight region.

Some examples of the method, apparatuses, and non-transitory computer-readable medium described herein may further include operations, features, means, or instructions for detecting a second motion region of the second full resolution frame based on the refined motion map and blending the detected motion region of the second full resolution frame into a portion of the second full resolution frame that surrounds the detected motion region.

Some examples of the method, apparatuses, and non-transitory computer-readable medium described herein may further include operations, features, means, or instructions for fusing, after the blending of the detected highlight region and the detected motion region, the first full resolution frame with the second full resolution frame.

In some examples of the method, apparatuses, and non-transitory computer-readable medium described herein, capturing the downscaled first frame and the downscaled second frame may include operations, features, means, or instructions for capturing the downscaled first frame at a first resolution that may be less than a full resolution of the sensor and capturing the downscaled second frame at a second resolution that may be the same or less than the first resolution.

Some examples of the method, apparatuses, and non-transitory computer-readable medium described herein may further include operations, features, means, or instructions for capturing the set of full resolution frames at the full resolution of the sensor.

DETAILED DESCRIPTION

Figure 1:
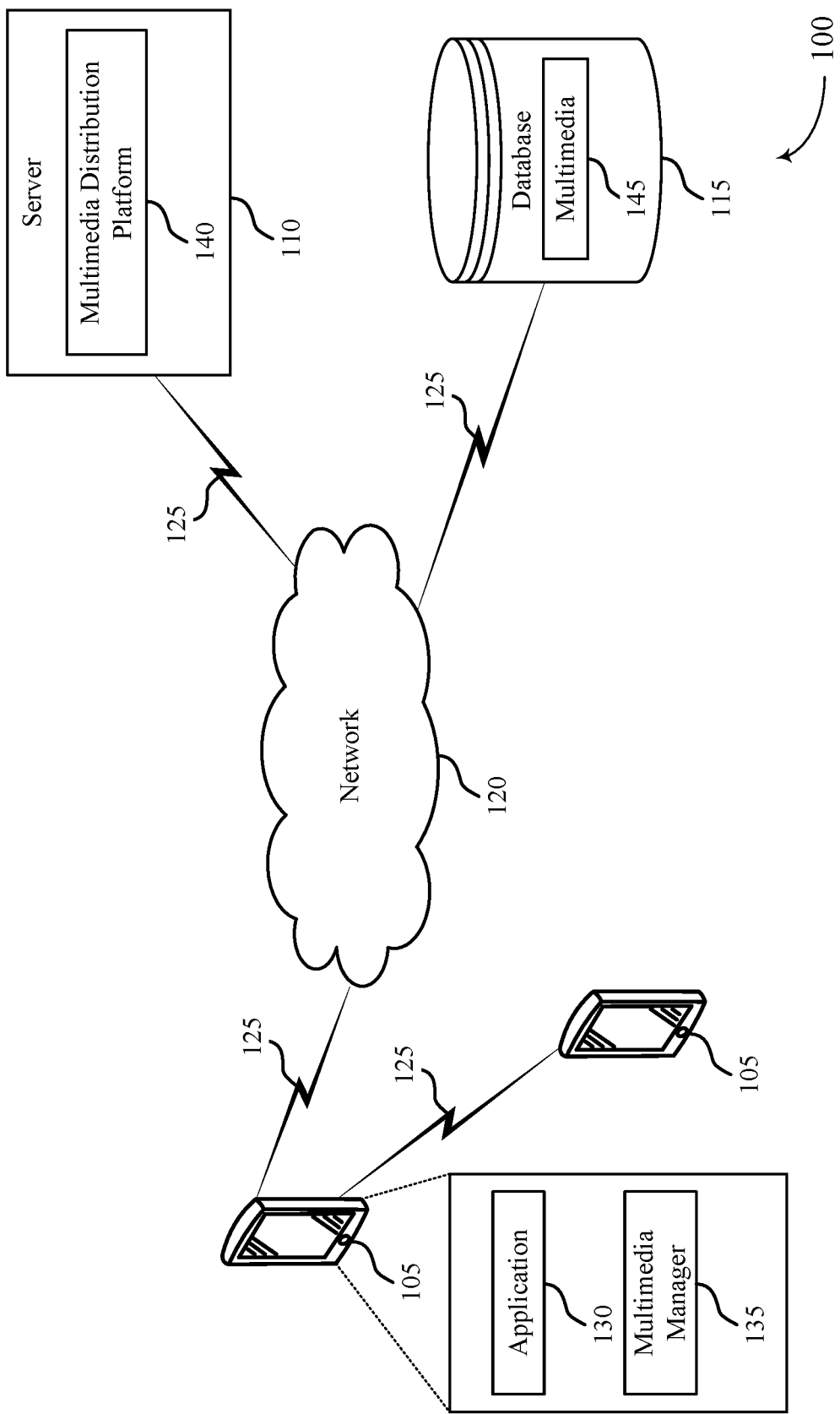
FIG. 1 illustrates an example of an image processing at a device system that supports minimizing ghosting in high dynamic range image processing in accordance with aspects of the present disclosure.

The present techniques relate to image processing, and specifically, to high dynamic range image processing.

High-dynamic-range (HDR) images are created by capturing several different images of the same subject matter at various exposure times and dynamic ranges, and then combining or fusing multiple frames of various exposures into a single HDR frame. The longer the exposure, the more saturated an image becomes. However, capturing an image of an object in motion that is moving across a saturated region of the image may result in visual errors after fusing the multiple images such as motion ghost artifacts (e.g., highlight motion ghost).

The present techniques may include using a relatively long exposure to capture one or more long exposure frames and using a relatively short exposure to capture one or more short exposure frames. The relatively short exposure frames provide higher dynamic range than the relatively long exposure frames, while the relatively long exposure frames provide lower noise levels than the relatively short exposure frames.

In some cases, the present techniques may include identifying a non-highlight region (e.g., one or more non-highlight regions) in the one or more long exposure frames, or identifying a highlight region (e.g., one or more highlight regions) in the one or more short exposure frames, or identifying a motion region (e.g., one or more motion regions) in the one or more short exposure frames, or identifying the motion region (e.g., the one or more highlight regions) in the one or more long exposure frames, or any combination thereof. In some cases, the present techniques may determine how to blend pixels of the non-highlight region with pixels of the highlight region, or how to blend pixels of the non-highlight region with pixels of the motion region, or how to blend pixels of the highlight region with pixels of the motion region, or any combination thereof.

In some cases, the present techniques may include determining whether the motion region overlaps the highlight region. In some cases, the present techniques may blend the pixels of the motion region based on whether the motion region overlaps the highlight region. In some examples, the present techniques may include dynamically selecting to blend the motion region from the one or more short exposure frames or to blend the motion region from the one or more long exposure frames. When it is determined that the motion region overlaps the highlight region, the present techniques may include merging the overlapping highlight region and motion region into a merged highlight/motion region and blending the pixels of the merged highlight/motion region from the one or more short exposures. When it is determined that the motion region does not overlap the highlight region, the present techniques may include blending the pixels of the motion region from the one or more long exposures.

Aspects of the subject matter described herein may be implemented to realize one or more advantages for highlight motion ghost handling. The described techniques may support improvements in system efficiency such that a device may dynamically select the appropriate exposure length for blending highlight motion regions to improve the balance between ghosting and noise.

Aspects of the disclosure are initially described in the context of a multimedia system. Aspects of the disclosure are further illustrated by and described with reference to block diagrams and process flows that relate to minimizing ghosting in high dynamic range image processing. Aspects of the disclosure are further illustrated by and described with reference to apparatus diagrams, system diagrams, and flowcharts that relate to minimizing ghosting in high dynamic range image processing.

FIG. 1 illustrates a multimedia system 100 for a device that supports minimizing ghosting in high dynamic range image processing in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports minimizing ghosting in high dynamic range image processing, such as multimedia packets, multimedia data, or multimedia control information, via network 120 using communications links 125 (e.g., wireless links, wired links, etc.). In some cases, a portion or all of the techniques described herein supporting minimizing ghosting in high dynamic range image processing may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support minimizing ghosting in high dynamic range image processing, according to the techniques described herein.

The server 110 may be a data server, a cloud server, a server associated with an multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support minimizing ghosting in high dynamic range image processing associated with the multimedia 145. The device 105 may retrieve the stored data from the database 115 via the network 120 using communications links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communications links 125 may transmit bidirectional communications and/or unidirectional communications. In some examples, the communications links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

In some examples, device 105 may capture from an image sensor of device 105 a downscaled first frame of a first exposure length and a downscaled second frame of a second exposure length that is longer than the first exposure length. In some cases, device 105 may capture one or more long exposure frames (e.g., captured at relatively long exposures), or one or more medium exposure frames that have a shorter exposure length than the one or more long exposure frames, or one or more short exposure frames that have a shorter exposure length than the one or more medium exposure frames, or any combination thereof.

In some examples, device 105 may identify a highlight region that is associated with the downscaled first frame. In some cases, device 105 may identify a motion region that is associated with the downscaled first frame and with the downscaled second frame. In some cases, the downscaled first frame may be associated with one or more frames captured at a relatively short exposure length. In some cases, the downscaled second frame may be associated with one or more frames captured at a relatively short exposure length and with one or more frames captured at a relatively long exposure length.

In some examples, device 105 may determine how to blend the motion region associated with the downscaled first frame and with the downscaled second frame based on whether at least a portion of the motion region overlaps the highlight region. In some cases, device 105 may blend the motion region of the downscaled frames according to this determination. In some cases, device 105 may blend the motion region associated with a set of full resolution frames according to this determination of how to blend the motion regions of the downscaled frames.

The techniques described herein may provide improvements in minimizing ghosting in high dynamic range image processing. Furthermore, the techniques described herein may provide benefits and enhancements to the operation of the devices 105. For example, by using a software library to refine a highlight map of one or more highlight regions and to refine a motion map of one or more motion regions, the operational characteristics, such as power consumption, processor utilization (e.g., DSP, CPU, GPU, ISP processing utilization), and memory usage of the devices 105 may be reduced. The techniques described herein may result in reducing ghosting artifacts while minimizing noise, decreasing system latency, improving hardware efficiency, and improving user experience.

Figure 2:
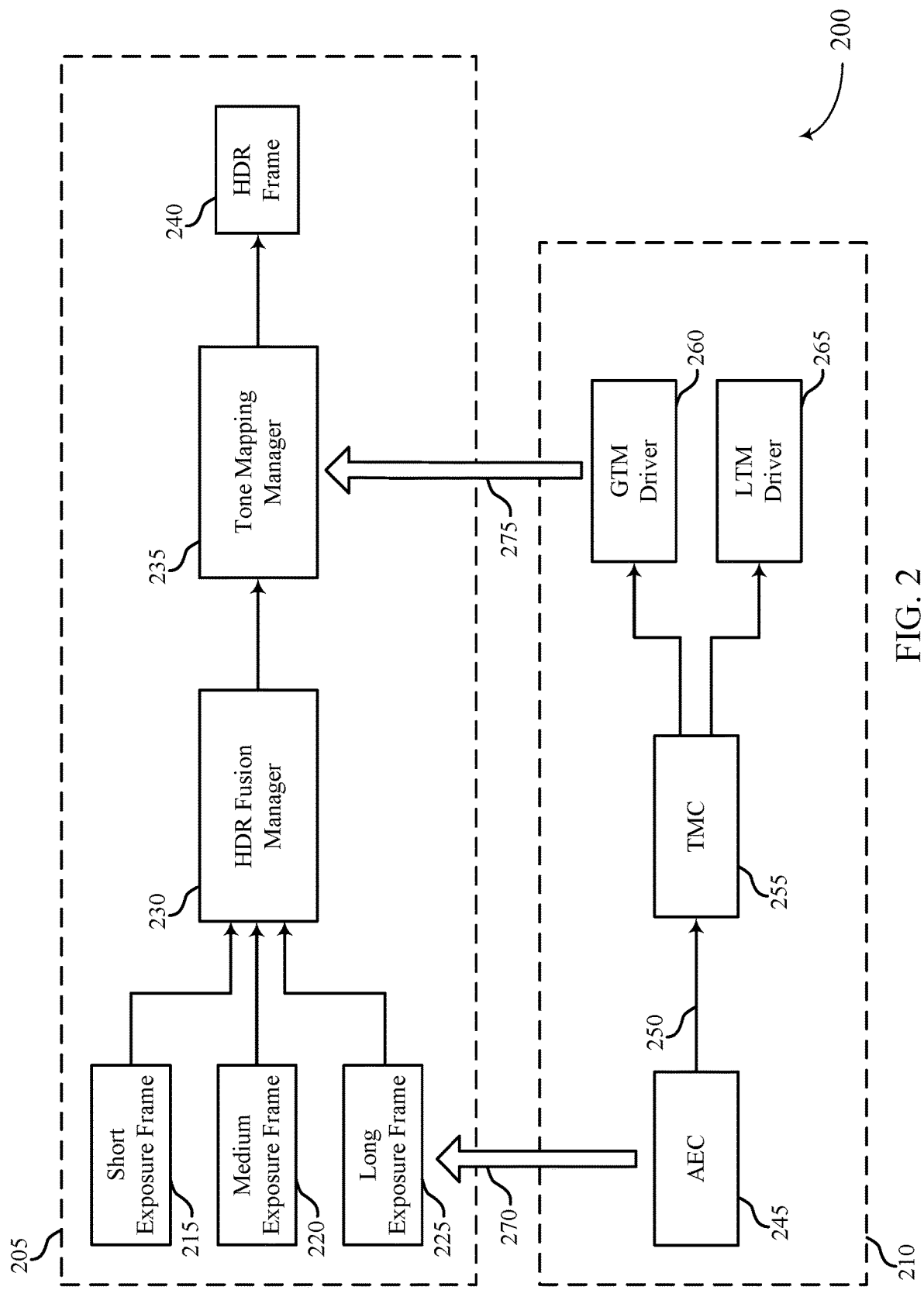
FIG. 2 illustrates an example of a block diagram that supports minimizing ghosting in high dynamic range image processing in accordance with aspects of the present disclosure.

FIG. 2 illustrates an example of a block diagram 200 that supports minimizing ghosting in high dynamic range image processing in accordance with aspects of the present disclosure.

As illustrated, a block diagram 200 may include a hardware layer 205 and a software layer 210 of a device (e.g., device 105 of FIG. 1). In some cases, hardware layer 205 may include memory, one or more processors, one or more image signal processors, one or more image sensors, etc. In some cases, software layer 210 may include software code, one or more software applications, one or more algorithms, one or more software libraries, image data, metadata, etc.

In the illustrated example, the hardware layer 205 may capture a short exposure frame 215 (e.g., one or more short exposure frames), or a medium exposure frame 220 (e.g., one or more medium exposure frames), or a long exposure frame 225 (e.g., one or more long exposure frames), or any combination thereof. As shown, the hardware layer 205 may include a high dynamic range (HDR) fusion manager 230 and a tone mapping manager 235. As shown, the tone mapping manager 235 may output a tone mapped HDR frame 240. In some cases, an image signal processor of the hardware layer 205 may include the HDR fusion manager 230 or the tone mapping manager 235, or both.

In the illustrated example, the software layer 210 may include an automatic exposure controller (AEC) 245, a tone mapping controller (TMC) 255, a global tone mapping (GTM) driver 260, and a local tone mapping (LTM) driver 265.

In some examples, the AEC 245 may provide one or more exposure settings 270 to hardware layer 205. In some cases, the hardware layer 205 may capture the short exposure frame 215, or the medium exposure frame 220, or the long exposure frame 225, or any combination thereof, based on the one or more exposure settings 270. In some cases, AEC 245 may determine one or more exposure settings based on image brightness and an image histogram. In some cases, the exposure settings may include exposure time and gain. In some cases, AEC 245 may provide the exposure settings to an image signal processor of the hardware layer 205 and the image signal processor may configure an image sensor based on the exposure settings.

In some examples, the HDR fusion manager 230 may receive and analyze the short exposure frame 215, the medium exposure frame 220, and the long exposure frame 225. In some cases, HDR fusion manager 230 may analyze the received frames to identify highlight regions (e.g., relatively high brightness regions or saturated regions) and motion regions (e.g., regions where motion occurs while the frames are captured) of the received frames. In some cases, the HDR fusion manager 230 may fuse the received frames into a HDR frame based on the analysis. In some cases, if a first frame has the same exposure as a second frame, the HDR fusion manager 230 may fuse the first frame and the second frame before fusing frames of different exposure lengths. In some cases, the HDR fusion manager 230 may provide the HDR frame to the tone mapping manager 235.

In some examples, the AEC 245 may provide dynamic range control (DRC) information 250 to TMC 255. The DRC information 250 may include DRC gain levels for one or more regions of the captured frames (e.g., the short exposure frame 215, or the medium exposure frame 220, or the long exposure frame 225, or any combination thereof). In some cases, the DRC information 250 may include DRC gain levels for relatively dark regions (e.g., for shaded areas of a frame, short exposure frames, etc.), DRC gain levels for neutral regions (e.g., medium exposure frames), DRC gain levels for highlight regions (e.g., for saturated areas of a frame, long exposure frames, etc.), etc.

In some examples, TMC 255 may apply tone mapping settings 275 for the captured frames (e.g., the short exposure frame 215, or the medium exposure frame 220, or the long exposure frame 225, or any combination thereof) based on the DRC information 250. In some cases, the TMC 255 may include a TMC library. In some cases, the TMC 255 may determine tone mapping control information based on the TMC library. In some cases, TMC 255 may provide the tone mapping control information to GTM driver 260 and LTM driver 265. In some cases, GTM driver 260 may generate global tone mapping settings for the captured frames based on the tone mapping control information received from TMC 255. In some cases, LTM driver 265 may generate local tone mapping settings for the captured frames based on the tone mapping control information received from TMC 255. In some cases, GTM driver 260 and LTM driver 265 may provide the tone mapping settings 275 to tone mapping manager 235. In some cases, the tone mapping settings 275 may include global tone mapping settings from GTM driver 260 or local tone mapping settings from LTM driver 265, or both.

In some examples, tone mapping manager 235 may perform tone mapping on the HDR frame based on the global tone mapping settings received from GTM driver 260. Additionally, or alternatively, tone mapping manager 235 may perform tone mapping on the HDR frame based on the local tone mapping settings received from LTM driver 265. In some cases, the global tone mapping settings or the local tone mapping settings, or both, may be based on analysis of one or more downscaled frames. In some cases, the tone mapping manager 235 may tone map a full resolution HDR frame received from HDR fusion manager 230 to one or more downscaled frames.

The present techniques may provide dynamically selecting to blend a motion region from short exposure frame 215 or to blend the motion region from long exposure frame 225, thus minimizing of ghosting artifacts in high dynamic range image processing. The described techniques may support improvements in hardware efficiency (e.g., reduce processor load, reduce memory usage, etc.) by using a software library to refine a highlight map of one or more highlight regions and to refine a motion map of one or more motion regions. In some cases, refining the highlight map and the motion map may include merging a motion region of the motion map with a highlight region of the highlight map, updating the motion map to remove the merged motion region, and updating the highlight map to add the merged motion region. In some cases, refining the motion map may include maintaining a motion region in the motion map. Accordingly, described techniques may result in reducing ghosting artifacts while minimizing noise, decreasing system latency, improving hardware efficiency, and improving user experience.

Figure 3:
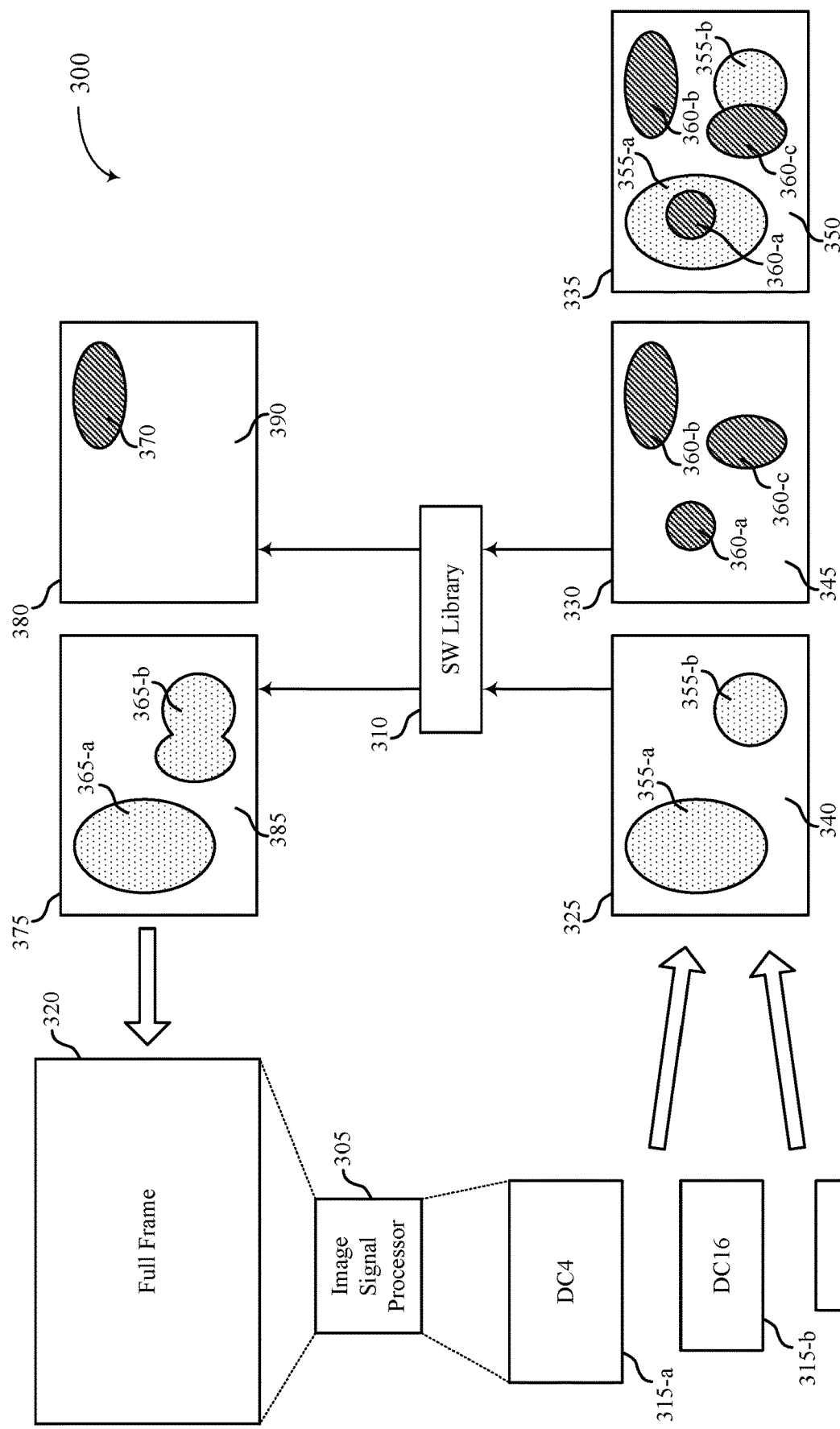
FIG. 3 illustrates an example of a block diagram that supports minimizing ghosting in high dynamic range image processing in accordance with aspects of the present disclosure.

FIG. 3 illustrates an example of a block diagram 300 that supports minimizing ghosting in high dynamic range image processing in accordance with aspects of the present disclosure.

In the illustrated example, block diagram 300 may include an image signal processor 305 and a software library 310. In some cases, image signal processor 305 may include one or more image sensors. In some cases, image signal processor 305 may be in a device (e.g., device 105). In some cases, image signal processor 305 may be part of a hardware layer (e.g., hardware layer 205). In some cases, software library may be part of a software layer (e.g., software layer 210).

In some cases, image signal processor 305 may capture (e.g., via one or more image sensors) one or more downscaled frames 315 (e.g., 315-a, 315-b, 315-c) and capture one or more full resolution frames 320. In some cases, downscaled frames 315 may include one or more frames with resolutions that are less than a full resolution of the image signal processor 305. In some cases, image signal processor 305 may capture the downscaled frames 315 at the full resolution and then downscale these full resolution images to one or more downscaled resolutions. Alternatively, image signal processor 305 may capture the downscaled frames 315 at one or more downscaled resolutions. In some cases, downscaled frame 315-a may have a resolution that is one-fourth the full resolution of the image signal processor 305, downscaled frame 315-b may have a resolution that is one-sixteenth the full resolution of the image signal processor 305, and downscaled frame 315-a may have a resolution that is one-sixty-fourth the full resolution of the image signal processor 305.

In some examples, image signal processor 305 may perform one or more operations in conjunction with a software layer (e.g., software layer 210). In some cases, the one or more operations may include the operations of image signal processor 305 described in relation to FIG. 3. In some cases, image signal processor 305 may generate a highlight map 325 or a motion map 330, or both, in relation to the one or more downscaled frames 315.

In some examples, the one or more downscaled frames 315 may include one or more frames (e.g., short exposure downscaled frames) captured at a relatively short exposure length, one or more frames (e.g., medium exposure downscaled frames) captured at a relatively medium exposure length, and one or more frames (e.g., long exposure downscaled frames) captured at a relatively long exposure length. In some cases, the one or more full resolution frames 320 may include one or more full resolution frames (e.g., short exposure full resolution frames) captured at a relatively short exposure length, one or more full resolution frames (e.g., medium exposure full resolution frames) captured at a relatively medium exposure length, and one or more full resolution frames (e.g., long exposure full resolution frames) captured at a relatively long exposure length.

In some cases, image signal processor 305 may identify highlight regions 355 based on an analysis of the one or more downscaled frames 315. In some cases, image signal processor 305 may identify motion regions 360 based on an analysis of the one or more downscaled frames 315. In some cases, image signal processor 305 may identify background regions (e.g., background regions 340, background regions 345, background regions 350) based on an analysis of the one or more downscaled frames 315.

In some cases, the highlight map 325 may include one or more highlight regions 355 (e.g., highlight region 355-a, highlight region 355-b) identified by image signal processor 305. In some cases, highlight regions 355 may include regions of the one or more downscaled frames 315 where the image signal processor 305 determines the saturation levels or luma levels of pixels within those regions exceed a highlight threshold, where the highlight threshold may include a predetermined luma level or brightness level per pixel. In some cases, highlight map 325 may include background region 340 (e.g., one or more background regions) of the highlight map (e.g., background regions of the one or more downscaled frames 315), where the image signal processor 305 determines the pixels within the background region are non-highlight regions and non-motion regions (e.g., non-highlight static regions).

In some cases, the motion map 330 may include one or more motion regions 360 (e.g., motion region 360-a, motion region 360-b, motion region 360-c) identified by image signal processor 305. In some cases, motion regions 360 may include regions of the one or more downscaled frames 315 that the image signal processor 305 determines to include movement. In some cases, image signal processor 305 may capture a sequence of two or more images to detect movement (e.g., identified objects changing position from a first frame captured at a first time and a second frame captured at a second time after the first time). In some cases, highlight map 325 may include background region 345 (e.g., one or more background regions) of the motion map 330 (e.g., background regions of the one or more downscaled frames 315).

In some examples, image signal processor 305 may dilate one or more highlight regions 355 or one or more motion regions 360, or both. In some cases, dilating a region may include determining a border of the region (e.g., an edge between the region and outside the region) and expanding the determined border by one or more pixels. In some cases, image signal processor 305 may dilate a highlight region 355 by n pixels and dilate a motion region 360 by m pixels, where n and m are positive integers between 1 to 100 pixels, and where n is equal to m, or n differs from m.

In some examples, image signal processor 305 may digitally overlap highlight map 325 and motion map 330 to generate highlight motion map 335. In some cases, image signal processor 305 may determine, based on highlight motion map 335, whether a motion region of motion map 330 overlaps a highlight region of highlight map 325. In the illustrated example, image signal processor 305 may determine that motion region 360-$a$ overlaps highlight region 355-$a$, that motion region 360-$b$ does not overlap a highlight region of highlight map 325, and that motion region 360-$b$ at least partially overlaps highlight region 355-$b$.

In some cases, image signal processor 305 may refine the highlight map 325 or motion map 330, or both, in conjunction with software library 310. In some cases, image signal processor 305 may identify a first pixel (e.g., a pixel of a highlight region 355, or a pixel of a highlight region 355 and motion region 360 that overlap in highlight motion map 335). In some cases, image signal processor 305 may identify a second pixel connected to the first pixel. In some cases, image signal processor 305 may determine whether the second pixel is static (e.g., a pixel of a background region that is not associated with a highlight region 355 or a motion region 360). When image signal processor 305 determines the second pixel is static, image signal processor 305 may include the second pixel in a background region. When image signal processor 305 determines the second pixel is not static, image signal processor 305 may add the second pixel to the region of the first pixel (e.g., a highlight region 355 or highlight region 355 and motion region 360 that overlap in highlight motion map 335). In some cases, image signal processor 305 may analyze a third pixel connected to the first pixel. When image signal processor 305 determines the third pixel has been previously analyzed, image signal processor 305 may skip the third pixel. In some cases, image signal processor 305 may continue analyzing each pixel of a region or each pixel of a frame until each associated pixel has been assigned to a highlight region 355, a motion region 360, highlight region 355 and motion region 360 that overlap in highlight motion map 335, or a background region (e.g., background region 340).

In some examples, refining the highlight map 325 and motion map 330 may include image signal processor 305 determining how to blend pixels of a background region (e.g., a non-highlight region, background region 440, background region 445, background region 450) with pixels of a highlight region 355, or how to blend pixels of a background region with pixels of a motion region 360, or how to blend pixels of a highlight region 355 with pixels of a motion region 360, or any combination thereof.

In some examples, refining the highlight map 325 and motion map 330 may include image signal processor 305 generating refined highlight map 375 and refined motion map 380. In some examples, image signal processor 305 may refine the highlight map 325 and motion map 330 in conjunction with the software library 310. In some cases, refining the highlight map 325 and motion map 330 may include removing a motion region 360 from motion map 330, adding a motion region 360 removed from motion map 330 to highlight map 325, merging a motion region 360 removed from motion map 330 with a highlight region 355 of highlight map 325, or retaining a motion region 360 in motion map 330.

In some examples, any motion region retained in a motion map may be identified in and blended from the one or more frames captured at the relatively long exposure length (e.g., long exposure downscaled frames). In some cases, highlight regions may be identified in and blended from the one or more frames captured at the relatively short exposure length (e.g., short exposure downscaled frames). Also, any motion region that is moved from a motion map to a highlight map based on overlapping a highlight region may be identified in and blended from the one or more frames captured at the relatively short exposure length (e.g., short exposure downscaled frames).

As shown, refined highlight map 375 may include refined highlight region 365-$a$ and refined highlight region 365-$b$. In the illustrated example, refined motion map 380 may include refined motion region 370. As indicated by highlight motion map 335, refined highlight region 365-$a$ may be based on a merging of highlight region 355-$a$ with motion region 360-$a$, and refined highlight region 365-$b$ may be based on a merging of highlight region 355-$b$ with motion region 360-$c$. In the illustrated example, refined motion region 370 may be based on retaining motion region 360-$b$ in motion map 330.

In some examples, in conjunction with the software library 310, image signal processor 305 may analyze one or more full resolution frames 320 in relation to the refined highlight map 375 and the refined motion map 380. In the illustrated example, the refined highlight region 365-$a$ and refined highlight region 365-$b$ may be mapped to respective regions of one or more full resolution frames 320 captured at a relatively short exposure length. In some cases, image signal processor 305 may identify highlight regions of the one or more full resolution frames 320 captured at a relatively short exposure length based on the highlight region mapping. In the illustrated example, the refined motion region 370 may be mapped to a respective region of one or more full resolution frames 320 captured at a relatively long exposure length. In some cases, image signal processor 305 may identify motion regions of the one or more full resolution frames 320 captured at a relatively long exposure length based on the motion region mapping. In some cases, image signal processor 305 may identify background regions (e.g., background region 385, background region 390) of the one or more full resolution frames 320 captured at a relatively medium exposure length or at a relatively short exposure length, or both.

In some cases, image signal processor 305 may merge the one or more full resolution frames 320 (e.g., one or more relatively short exposure length frames, one or more relatively medium exposure length frames, and one or more relatively long exposure length frames) based on the refined highlight map 375 and refined motion map 380. In some cases, image signal processor 305 may blend the identified highlight regions of the one or more full resolution frames 320 captured at the relatively short exposure length with the identified motion regions of the one or more full resolution frames 320 captured at a relatively long exposure length. In some cases, the image signal processor 305 may blend these identified highlight regions and identified motion regions with the identified background regions of the one or more full resolution frames 320. In some cases, the identified background regions may be identified in the one or more full resolution frames 320 captured at relatively short exposure lengths, or relatively medium exposure length, or relatively long exposure lengths, or any combination thereof. In some cases, the image signal processor 305 may blend the identified highlight regions, identified motion regions, and identified background regions to generate a high dynamic range image.

In some cases, the image signal processor 305, in conjunction with an associated software layer, may minimize ghosting artifacts in high dynamic range image processing based on the described dynamic selection and blending of highlight regions, motion regions, and background regions. In some cases, the image signal processor 305, in conjunction with an associated software layer, improve hardware efficiency (e.g., reduce processor load, reduce memory usage, etc.) by using a software library to refine highlight maps and motion maps. Accordingly, the described operations of the image signal processor 305, in conjunction with an associated software layer, may result in reducing ghosting artifacts while minimizing noise, decreasing system latency, improving hardware efficiency, and improving user experience.

Figure 4:
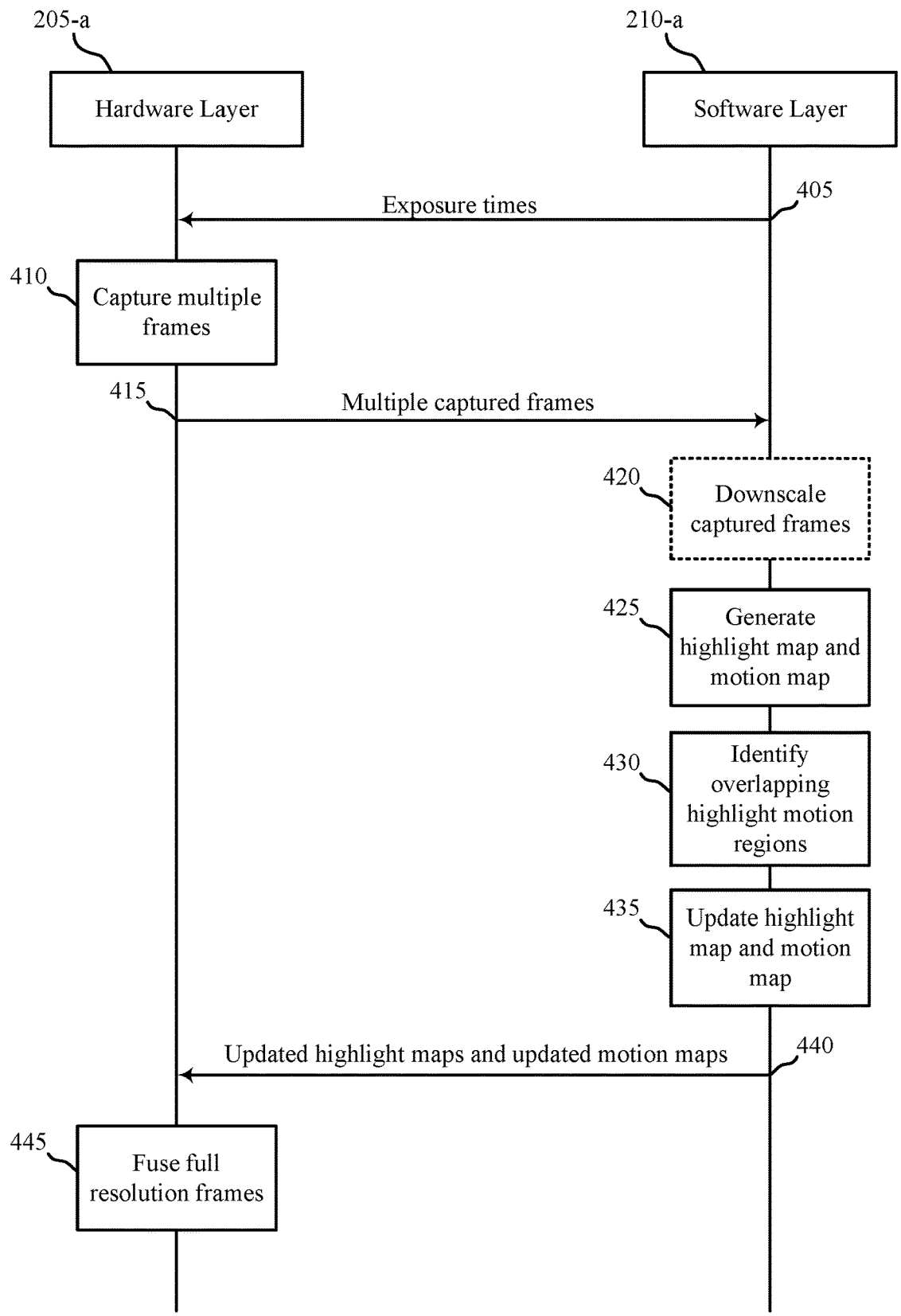
FIG. 4 illustrates an example of a process flow that supports minimizing ghosting in high dynamic range image processing in accordance with aspects of the present disclosure.

FIG. 4 illustrates an example of a process flow 400 that supports minimizing ghosting in high dynamic range image processing in accordance with aspects of the present disclosure.

At 405, software layer 210-*a* may provide one or more exposure times to hardware layer 205-*a*. In some cases, software layer 210-*a* may compute one or more exposure algorithms (e.g., AEC algorithms) to determine the one or more exposure times.

At 410, hardware layer 205-*a* may capture multiple frames at one or more exposures. In some cases, the one or more exposures may be based on the exposure times provided by software layer 210-*a*. In some cases, the multiple frames may include one or more frames captured at a relatively short exposure time and one or more frames captured at a relatively long exposure time. In some cases, the multiple frames may include one or more frames captured at a relatively medium exposure time that is between the relatively short exposure time and the relatively long exposure time. In some cases, the multiple frames may include one or more full exposure frames and one or more downscaled frames. In some cases, the one or more downscaled frames may be generated (e.g., downscaled) from the one or more full exposure frames. In some cases, the downscaled frames may be captured at the downscaled resolution.

At 415, hardware layer 205-*a* may provide (e.g., provide access to) the multiple captured frames to software layer 210-*a*.

At 420, software layer 210-*a* may optionally downscale one or more of the multiple captured frames. In some cases, the hardware layer 205-*a* may optionally capture one or more downscaled frames. Accordingly, one or more of the multiple captured frames may include the downscaled frames optionally captured by hardware layer 205-*a*.

At 425, software layer 210-*a* may identify one or more highlight regions in one or more long exposure frames and generate a highlight map that includes the identified one or more highlight regions. In some cases, software layer 210-*a* may identify one or more motion regions (e.g., in the one or more downscaled frames) and generate a motion map that includes the identified one or more motion regions. In some cases, software layer 210-*a* may identify one or more background regions in the highlight map or the motion map, or both.

At 430, software layer 210-*a* may identify a motion region that overlaps a highlight region (e.g., a highlight motion region). In some cases, software layer 210-*a* may digitally overlap the highlight map and the motion map to identify overlaps between the one or more highlight regions and the one or more motion regions.

At 435, software layer 210-*a* may update the highlight map and the motion map based on the identified overlaps. In some cases, software layer 210-*a* may remove an overlapping motion region from the motion map and add the overlapping motion region to the highlight map. In some cases, software layer 210-*a* may merge a motion region and highlight region that overlap into a new highlight region of the highlight map.

At 440, software layer 210-*a* may provide the updated highlight map and updated motion map to the hardware layer 205-*a*.

At 445, hardware layer 205-*a* may fuse two or more full resolution frames based on the updated highlight map and updated motion map. In some cases, hardware layer 205-*a* may map a short exposure full resolution frame to the updated highlight map to identify highlight regions of the short exposure full resolution frame. In some cases, hardware layer 205-*a* may map a long exposure full resolution frame to the updated motion map to identify motion regions of the long exposure full resolution frame. In some cases, hardware layer 205-*a* may map a medium exposure full resolution frame to the updated highlight map or updated motion map, or both, to identify background regions in the short exposure full resolution frame or the long exposure full resolution frame, or both. In some cases, hardware layer 205-*a* may fuse the identified highlight regions with the identified motion regions and with the identified background regions to generate a high dynamic range image.

Figure 5:
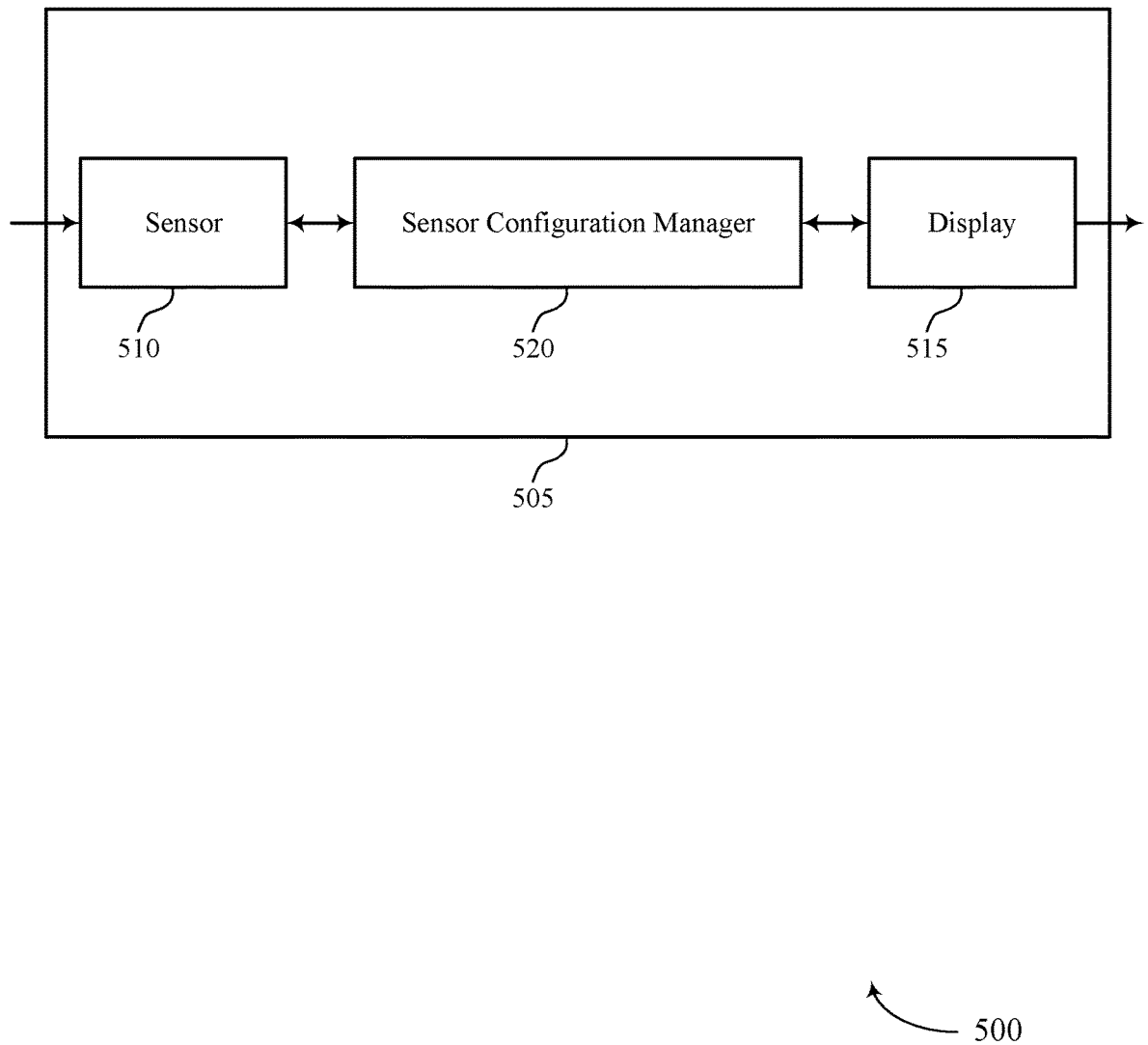
FIGS. 5 and 6 show block diagrams of devices that support minimizing ghosting in high dynamic range image processing in accordance with aspects of the present disclosure.

FIG. 5 shows a block diagram 500 of a device 505 that supports minimizing ghosting in high dynamic range image processing in accordance with aspects of the present disclosure. The device 505 may be an example of aspects of a Camera Device as described herein. The device 505 may include a sensor 510, a display 515, and a sensor configuration manager 520. The device 505 may also include a processor. Each of these components may be in communication with one another (e.g., via one or more buses).

The one or more sensors 510 (e.g., image sensors, cameras, etc.) may receive information (e.g., light, for example, visible light and/or invisible light), which may be passed on to other components of the device 505. In some cases, the sensors 510 may be an example of aspects of the I/O controller 810 described with reference to FIG. 8. A sensor 510 may utilize one or more photosensitive elements that have a sensitivity to a spectrum of electromagnetic radiation to receive information (e.g., a sensor 510 may be configured or tuned to receive a pixel intensity value, red green blue (RGB) values, infrared (IR) light values, near-IR light values, ultraviolet (UV) light values of a pixel, etc.). The information may then be passed on to other components of the device 505.

Display 515 may display content generated by other components of the device. Display 515 may be an example of display 830 as described with reference to FIG. 8. In some examples, display 830 may be connected with a display buffer which stores rendered data until an image is ready to be displayed (e.g., as described with reference to FIG. 8). The display 515 may illuminate according to signals or information generated by other components of the device 505. For example, the display 515 may receive display information (e.g., pixel mappings, display adjustments) from sensor 510, and may illuminate accordingly. The display 515 may represent a unit capable of displaying video, images, text or any other type of data for consumption by a viewer. Display 515 may include a liquid-crystal display (LCD), a light emitting diode (LED) display, an organic LED (OLED), an active-matrix OLED (AMOLED), or the like. In some cases, display 515 and an I/O controller (e.g., I/O controller 810) may be or represent aspects of a same component (e.g., a touchscreen) of device 505. The display 515 may be any suitable display or screen allowing for user interaction and/or allowing for presentation of information (such as captured images and video) for viewing by a user. In some aspects, the display 515 may be a touch-sensitive display. In some cases, the display 515 may display images captured by sensors, where the displayed images that are captured by sensors may depend on the configuration of light sources and active sensors by the sensor configuration manager 520.

The sensor configuration manager 520, the sensor 510, the display 515, or various combinations thereof or various components thereof may be examples of means for performing various aspects of minimizing ghosting in high dynamic range image processing as described herein. For example, the sensor configuration manager 520, the sensor 510, the display 515, or various combinations or components thereof may support a method for performing one or more of the functions described herein.

In some examples, the sensor configuration manager 520, the sensor 510, the display 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the sensor configuration manager 520, the sensor 510, the display 515, or various combinations or components thereof may be implemented in code (e.g., as communications management software or firmware) executed by a processor. If implemented in code executed by a processor, the functions of the sensor configuration manager 520, the sensor 510, the display 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the sensor configuration manager 520 may be configured to perform various operations (e.g., receiving, monitoring, transmitting) using or otherwise in cooperation with the sensor 510, the display 515, or both. For example, the sensor configuration manager 520 may receive information from the sensor 510, send information to the display 515, or be integrated in combination with the sensor 510, the display 515, or both to receive information, transmit information, or perform various other operations as described herein.

The sensor configuration manager 520 may support image processing at a device in accordance with examples as disclosed herein. For example, the sensor configuration manager 520 may be configured as or otherwise support a means for capturing from a sensor of the device a downscaled first frame of a first exposure length and a downscaled second frame of a second exposure length that is longer than the first exposure length. The sensor configuration manager 520 may be configured as or otherwise support a means for identifying a highlight region associated with the downscaled first frame and a motion region associated with the downscaled first frame and with the downscaled second frame. The sensor configuration manager 520 may be configured as or otherwise support a means for blending the motion region in accordance with determining whether at least a portion of the motion region overlaps the highlight region. The sensor configuration manager 520 may be configured as or otherwise support a means for incorporating the blending of the motion region in a set of full resolution frames.

By including or configuring the sensor configuration manager 520 in accordance with examples as described herein, the device 505 (e.g., a processor controlling or otherwise coupled to the sensor 510, the display 515, the sensor configuration manager 520, or a combination thereof) may support techniques for improving hardware efficiency (e.g., reducing processor load, reducing memory usage, etc.) by using a software library to refine a highlight map of one or more highlight regions and to refine a motion map of one or more motion regions. Accordingly, described techniques may result in reducing ghosting artifacts while minimizing noise, decreasing system latency, improving hardware efficiency, and improving user experience.

Figure 6:
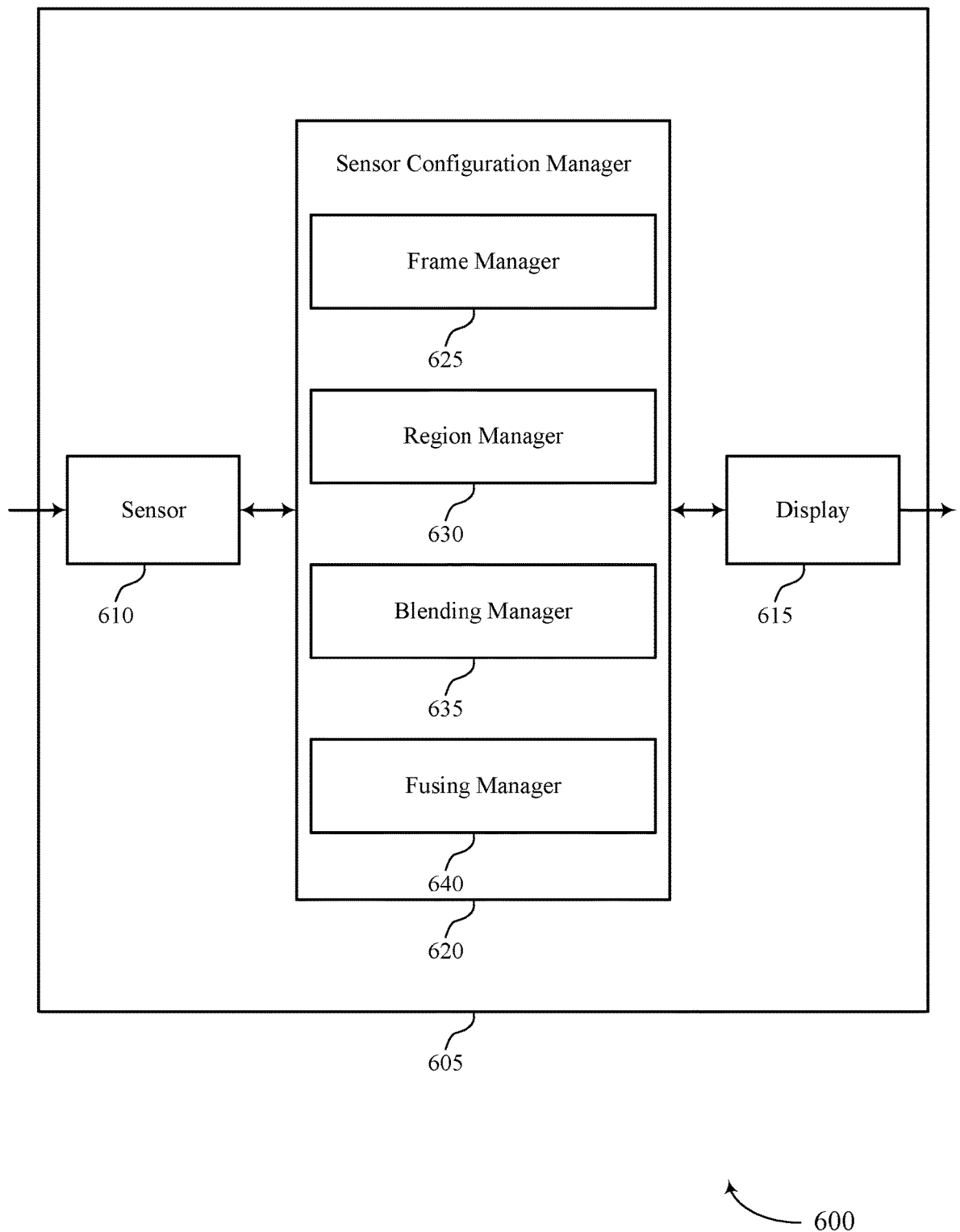

FIG. 6 shows a block diagram 600 of a device 605 that supports minimizing ghosting in high dynamic range image processing in accordance with aspects of the present disclosure. The device 605 may be an example of aspects of a device 505 or a Camera Device 115 as described herein. The device 605 may include a sensor 610, a display 615, and a sensor configuration manager 620. The device 605 may also include a processor. Each of these components may be in communication with one another (e.g., via one or more buses).

The one or more sensors 610 (e.g., image sensors, cameras, etc.) may receive information (e.g., light, for example, visible light and/or invisible light), which may be passed on to other components of the device 605. In some cases, the sensors 610 may be an example of aspects of the I/O controller 810 described with reference to FIG. 8. A sensor 610 may utilize one or more photosensitive elements that have a sensitivity to a spectrum of electromagnetic radiation to receive information (e.g., a sensor 610 may be configured or tuned to receive a pixel intensity value, red green blue (RGB) values, infrared (IR) light values, near-IR light values, ultraviolet (UV) light values of a pixel, etc.). The information may then be passed on to other components of the device 605.

Display 615 may display content generated by other components of the device. Display 615 may be an example of display 830 as described with reference to FIG. 8. In some examples, display 830 may be connected with a display buffer which stores rendered data until an image is ready to be displayed (e.g., as described with reference to FIG. 8). The display 615 may illuminate according to signals or information generated by other components of the device 605. For example, the display 615 may receive display information (e.g., pixel mappings, display adjustments) from sensor 610, and may illuminate accordingly. The display 615 may represent a unit capable of displaying video, images, text or any other type of data for consumption by a viewer. Display 615 may include a liquid-crystal display (LCD), a light emitting diode (LED) display, an organic LED (OLED), an active-matrix OLED (AMOLED), or the like. In some cases, display 615 and an I/O controller (e.g., I/O controller 810) may be or represent aspects of a same component (e.g., a touchscreen) of device 605. The display 615 may be any suitable display or screen allowing for user interaction and/or allowing for presentation of information (such as captured images and video) for viewing by a user. In some aspects, the display 615 may be a touch-sensitive display. In some cases, the display 615 may display images captured by sensors, where the displayed images that are captured by sensors may depend on the configuration of light sources and active sensors by the sensor configuration manager 620.

The device 605, or various components thereof, may be an example of means for performing various aspects of minimizing ghosting in high dynamic range image processing as described herein. For example, the sensor configuration manager 620 may include a frame manager 625, a region manager 630, a blending manager 635, a fusing manager 640, or any combination thereof. The sensor configuration manager 620 may be an example of aspects of a sensor configuration manager 520 as described herein. In some examples, the sensor configuration manager 620, or various components thereof, may be configured to perform various operations (e.g., receiving, monitoring, transmitting) using or otherwise in cooperation with the sensor 610, the display 615, or both. For example, the sensor configuration manager 620 may receive information from the sensor 610, send information to the display 615, or be integrated in combination with the sensor 610, the display 615, or both to receive information, transmit information, or perform various other operations as described herein.

The sensor configuration manager 620 may support image processing at a device in accordance with examples as disclosed herein. The frame manager 625 may be configured as or otherwise support a means for capturing from a sensor of the device a downscaled first frame of a first exposure length and a downscaled second frame of a second exposure length that is longer than the first exposure length. The region manager 630 may be configured as or otherwise support a means for identifying a highlight region associated with the downscaled first frame and a motion region associated with the downscaled first frame and with the downscaled second frame. The blending manager 635 may be configured as or otherwise support a means for blending the motion region in accordance with determining whether at least a portion of the motion region overlaps the highlight region. The fusing manager 640 may be configured as or otherwise support a means for incorporating the blending of the motion region in a set of full resolution frames.

Figure 7:
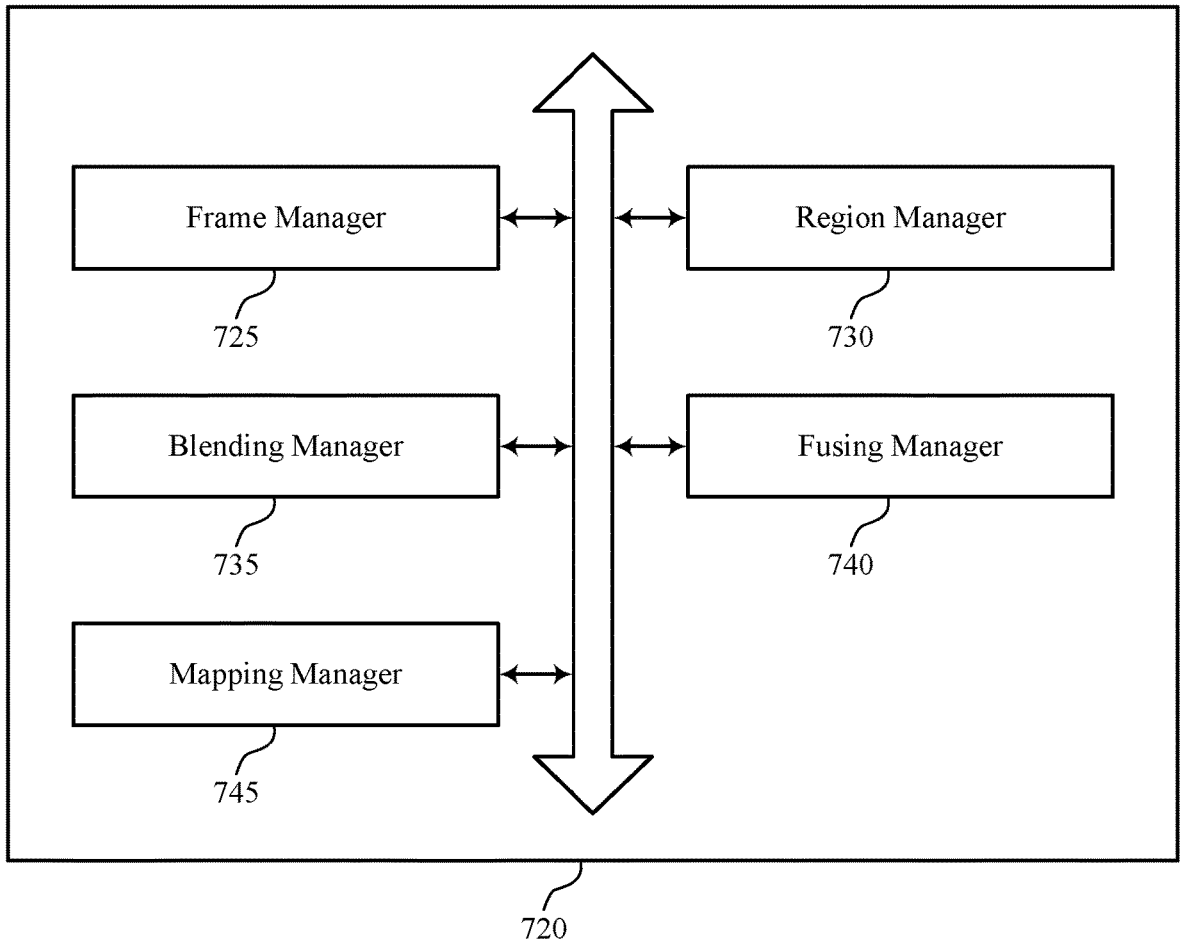
FIG. 7 shows a block diagram of a sensor configuration manager that supports minimizing ghosting in high dynamic range image processing in accordance with aspects of the present disclosure.

FIG. 7 shows a block diagram 700 of a sensor configuration manager 720 that supports minimizing ghosting in high dynamic range image processing in accordance with aspects of the present disclosure. The sensor configuration manager 720 may be an example of aspects of a sensor configuration manager 520, a sensor configuration manager 620, or both, as described herein. The sensor configuration manager 720, or various components thereof, may be an example of means for performing various aspects of minimizing ghosting in high dynamic range image processing as described herein. For example, the sensor configuration manager 720 may include a frame manager 725, a region manager 730, a blending manager 735, a fusing manager 740, a mapping manager 745, or any combination thereof. Each of these components may communicate, directly or indirectly, with one another (e.g., via one or more buses).

The sensor configuration manager 720 may support image processing at a device in accordance with examples as disclosed herein. The frame manager 725 may be configured as or otherwise support a means for capturing from a sensor of the device a downscaled first frame of a first exposure length and a downscaled second frame of a second exposure length that is longer than the first exposure length. The region manager 730 may be configured as or otherwise support a means for identifying a highlight region associated with the downscaled first frame and a motion region associated with the downscaled first frame and with the downscaled second frame. The blending manager 735 may be configured as or otherwise support a means for blending the motion region in accordance with determining whether at least a portion of the motion region overlaps the highlight region. The fusing manager 740 may be configured as or otherwise support a means for incorporating the blending of the motion region in a set of full resolution frames.

In some examples, the mapping manager 745 may be configured as or otherwise support a means for generating a highlight map including one or more highlight regions identified in the downscaled first frame, where the one or more highlight regions include the highlight region. In some examples, the mapping manager 745 may be configured as or otherwise support a means for generating a motion map including one or more motion regions identified in the downscaled first frame and in the downscaled second frame, where the one or more motion regions include the motion region.

In some examples, the mapping manager 745 may be configured as or otherwise support a means for analyzing coordinates of the one or more highlight regions in relation to coordinates of the one or more motion regions. In some examples, the mapping manager 745 may be configured as or otherwise support a means for determining, in accordance with the analyzing, that at least the portion of the motion region overlaps the highlight region.

In some examples, the mapping manager 745 may be configured as or otherwise support a means for generating a refined highlight map by adding at least the portion of the motion region that overlaps the highlight region to the highlight map. In some examples, the mapping manager 745 may be configured as or otherwise support a means for generating a refined motion map by removing at least the portion of the motion region that overlaps the highlight region from the motion map.

In some examples, the set of full resolution frames includes a first full resolution frame captured at the first exposure length and a second full resolution frame captured at the second exposure length.

In some examples, the mapping manager 745 may be configured as or otherwise support a means for detecting a second highlight region of the first full resolution frame based on the refined highlight map. In some examples, the mapping manager 745 may be configured as or otherwise support a means for blending the detected highlight region of the first full resolution frame into a portion of the first full resolution frame that surrounds the detected highlight region.

In some examples, the mapping manager 745 may be configured as or otherwise support a means for detecting a second motion region of the second full resolution frame based on the refined motion map. In some examples, the mapping manager 745 may be configured as or otherwise support a means for blending the detected motion region of the second full resolution frame into a portion of the second full resolution frame that surrounds the detected motion region.

In some examples, the fusing manager 740 may be configured as or otherwise support a means for fusing, after the blending of the detected highlight region and the detected motion region, the first full resolution frame with the second full resolution frame.

In some examples, to support capturing the downscaled first frame and the downscaled second frame, the frame manager 725 may be configured as or otherwise support a means for capturing the downscaled first frame at a first resolution that is less than a full resolution of the sensor. In some examples, to support capturing the downscaled first frame and the downscaled second frame, the frame manager 725 may be configured as or otherwise support a means for capturing the downscaled second frame at a second resolution that is the same as or less than the first resolution.

In some examples, the frame manager 725 may be configured as or otherwise support a means for capturing the set of full resolution frames at the full resolution of the sensor.

Figure 8:
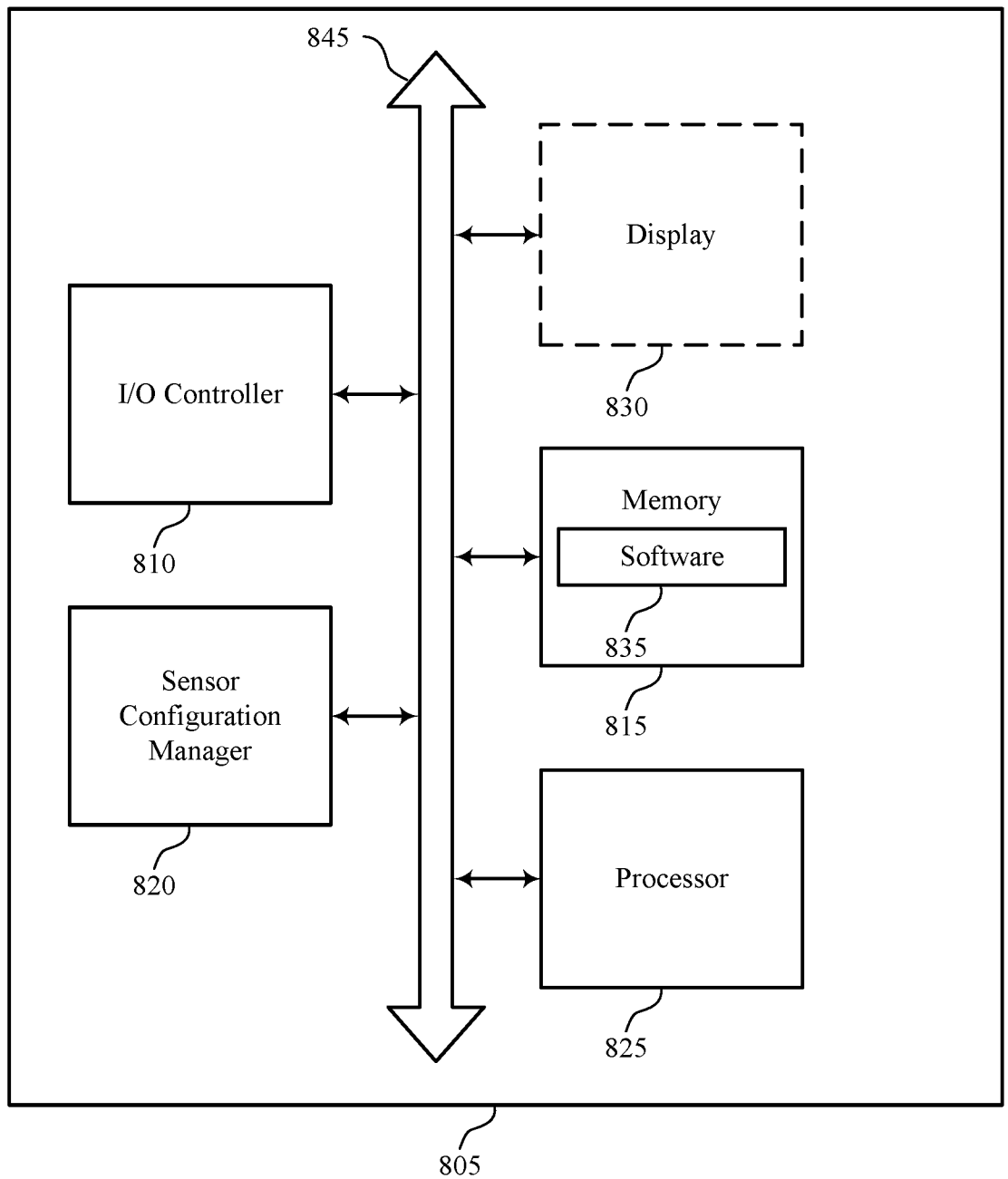
FIG. 8 shows a diagram of a system including a device that supports minimizing ghosting in high dynamic range image processing in accordance with aspects of the present disclosure.

FIG. 8 shows a diagram of a system 800 including a device 805 that supports minimizing ghosting in high dynamic range image processing in accordance with aspects of the present disclosure. The device 805 may be an example of or include the components of a device 505, a device 605, or a Camera Device as described herein. The device 805 may include components for bi-directional voice and data communications including components for transmitting and receiving communications, such as an I/O controller 810, a memory 815, a sensor configuration manager 820, a processor 825, and a display 830. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In some other cases, the I/O controller 810 may represent or interact with a modem, a keyboard, a mouse, a touchscreen, or a similar device. In some cases, the I/O controller 810 may be implemented as part of a processor, such as the processor 825. In some cases, a user may interact with the device 805 via the I/O controller 810 or via hardware components controlled by the I/O controller 810.

The memory 815 may include RAM and ROM. The memory 815 may store computer-readable, computer-executable code 835 including instructions that, when executed by the processor 825, cause the device 805 to perform various functions described herein. The code 835 may be stored in a non-transitory computer-readable medium such as system memory or other type of memory. In some cases, the code 835 may not be directly executable by the processor 825 but may cause a computer (e.g., when compiled and executed) to perform functions described herein. In some cases, the memory 815 may contain, among other things, a BIOS which may control basic hardware or software operation such as the interaction with peripheral components or devices.

The processor 825 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 825 may be configured to operate a memory array using a memory controller. In some other cases, a memory controller may be integrated into the processor 825. The processor 825 may be configured to execute computer-readable instructions stored in a memory (e.g., the memory 815) to cause the device 805 to perform various functions (e.g., functions or tasks supporting minimizing ghosting in high dynamic range image processing). For example, the device 805 or a component of the device 805 may include a processor 825 and memory 815 coupled to the processor 825, the processor 825 and memory 815 configured to perform various functions described herein.

In some cases, device 805 may include one or more light sources capable of emitting visible light and/or invisible light. In an example, the light sources may include a visible light source and an active invisible light source (e.g., IR light source, near-IR light source, UV light source).

The sensor configuration manager 820 may support image processing at a device in accordance with examples as disclosed herein. For example, the sensor configuration manager 820 may be configured as or otherwise support a means for capturing from a sensor of the device a downscaled first frame of a first exposure length and a downscaled second frame of a second exposure length that is longer than the first exposure length. The sensor configuration manager 820 may be configured as or otherwise support a means for identifying a highlight region associated with the downscaled first frame and a motion region associated with the downscaled first frame and with the downscaled second frame. The sensor configuration manager 820 may be configured as or otherwise support a means for blending the motion region in accordance with determining whether at least a portion of the motion region overlaps the highlight region. The sensor configuration manager 820 may be configured as or otherwise support a means for incorporating the blending of the motion region in a set of full resolution frames.

By including or configuring the sensor configuration manager 820 in accordance with examples as described herein, the device 805 may support techniques for improving hardware efficiency (e.g., reducing processor load, reducing power consumption, reducing memory usage, etc.) by using a software library to refine a highlight map of one or more highlight regions and to refine a motion map of one or more motion regions. Accordingly, described techniques may result in reducing ghosting artifacts while minimizing noise, decreasing system latency, increasing battery life, and improving user experience.

The sensor configuration manager 820, or its sub-components, may be implemented in hardware, code (e.g., software or firmware) executed by a processor, or any combination thereof. If implemented in code executed by a processor, the functions of the sensor configuration manager 820, or its sub-components may be executed by a general-purpose processor, a DSP, an ASIC, a field programmable gate array (FPGA) or other programmable logic device, discrete gate or transistor logic, discrete hardware components, or any combination thereof designed to perform the functions described in the present disclosure. The sensor configuration manager 820, or its sub-components, may be physically located at various positions, including being distributed such that portions of functions are implemented at different physical locations by one or more physical components. In some examples, the sensor configuration manager 820, or its sub-components, may be a separate and distinct component in accordance with various aspects of the present disclosure. In some examples, the sensor configuration manager 820, or its sub-components, may be combined with one or more other hardware components, including but not limited to an I/O component, a camera controller, another computing device, one or more other components described in the present disclosure, or a combination thereof in accordance with various aspects of the present disclosure.

In some examples, display 830 may display high-dynamic-range (HDR) images and other graphics based on processing performed by configuration manager 820 (e.g., processing of alias instructions by configuration manager 820). In some examples, display 830 may or at least some of its sub-components may be implemented in hardware, software executed by processor 825, firmware, or any combination thereof. When implemented in software executed by processor 825, the functions of the display 830 and/or at least some of its various sub-components may be executed by configuration manager 820, which may include at least one of a general-purpose processor, a DSP, an ASIC, an FPGA or other programmable logic device, discrete gate or transistor logic, discrete hardware components, or any combination thereof designed to perform the functions described in the present disclosure.

Figure 9:
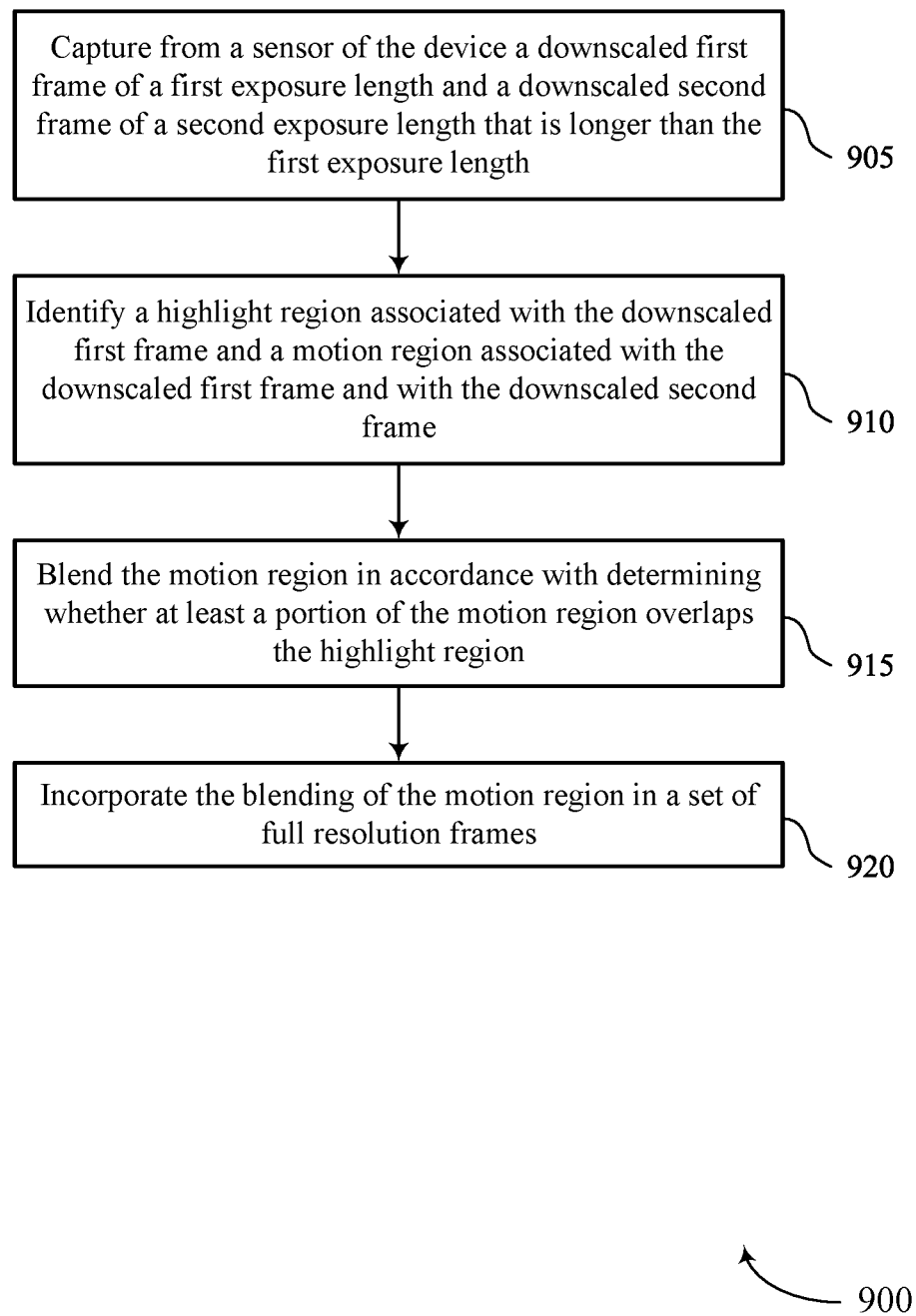
FIGS. 9 and 10 show flowcharts illustrating methods that support minimizing ghosting in high dynamic range image processing in accordance with aspects of the present disclosure.

FIG. 9 shows a flowchart illustrating a method 900 that supports minimizing ghosting in high dynamic range image processing in accordance with aspects of the present disclosure. The operations of the method 900 may be implemented by a Camera Device or its components as described herein. For example, the operations of the method 900 may be performed by a Camera Device as described with reference to FIGS. 1 through 8. In some examples, a Camera Device may execute a set of instructions to control the functional elements of the Camera Device to perform the described functions. Additionally or alternatively, the Camera Device may perform aspects of the described functions using special-purpose hardware.

At 905, the method may include capturing from a sensor of the device a downscaled first frame of a first exposure length and a downscaled second frame of a second exposure length that is longer than the first exposure length. The operations of 905 may be performed in accordance with examples as disclosed herein. In some examples, aspects of the operations of 905 may be performed by a frame manager 725 as described with reference to FIG. 7.

At 910, the method may include identifying a highlight region associated with the downscaled first frame and a motion region associated with the downscaled first frame and with the downscaled second frame. The operations of 910 may be performed in accordance with examples as disclosed herein. In some examples, aspects of the operations of 910 may be performed by a region manager 730 as described with reference to FIG. 7.

At 915, the method may include blending the motion region in accordance with determining whether at least a portion of the motion region overlaps the highlight region. The operations of 915 may be performed in accordance with examples as disclosed herein. In some examples, aspects of the operations of 915 may be performed by a blending manager 735 as described with reference to FIG. 7.

At 920, the method may include incorporating the blending of the motion region in a set of full resolution frames. The operations of 920 may be performed in accordance with examples as disclosed herein. In some examples, aspects of the operations of 920 may be performed by a fusing manager 740 as described with reference to FIG. 7.

Figure 10:
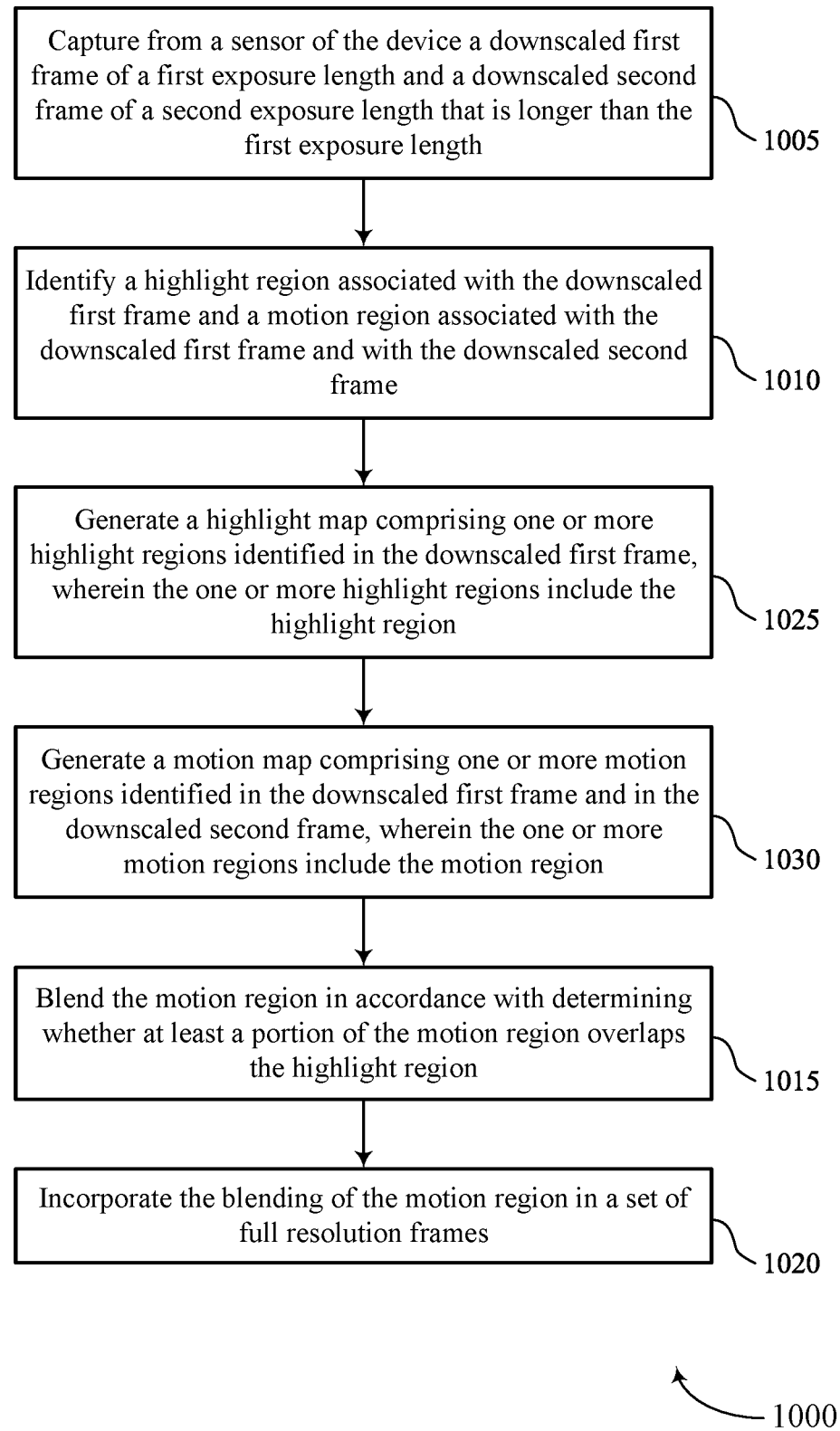

FIG. 10 shows a flowchart illustrating a method 1000 that supports minimizing ghosting in high dynamic range image processing in accordance with aspects of the present disclosure. The operations of the method 1000 may be implemented by a Camera Device or its components as described herein. For example, the operations of the method 1000 may be performed by a Camera Device as described with reference to FIGS. 1 through 8. In some examples, a Camera Device may execute a set of instructions to control the functional elements of the Camera Device to perform the described functions. Additionally or alternatively, the Camera Device may perform aspects of the described functions using special-purpose hardware.

At 1005, the method may include capturing from a sensor of the device a downscaled first frame of a first exposure length and a downscaled second frame of a second exposure length that is longer than the first exposure length. The operations of 1005 may be performed in accordance with examples as disclosed herein. In some examples, aspects of the operations of 1005 may be performed by a frame manager 725 as described with reference to FIG. 7.

At 1010, the method may include identifying a highlight region associated with the downscaled first frame and a motion region associated with the downscaled first frame and with the downscaled second frame. The operations of 1010 may be performed in accordance with examples as disclosed herein. In some examples, aspects of the operations of 1010 may be performed by a region manager 730 as described with reference to FIG. 7.

At 1015, the method may include generating a highlight map including one or more highlight regions identified in the downscaled first frame, where the one or more highlight regions include the highlight region. The operations of 1015 may be performed in accordance with examples as disclosed herein. In some examples, aspects of the operations of 1015 may be performed by a mapping manager 745 as described with reference to FIG. 7.

At 1020, the method may include generating a motion map including one or more motion regions identified in the downscaled first frame and in the downscaled second frame, where the one or more motion regions include the motion region. The operations of 1020 may be performed in accordance with examples as disclosed herein. In some examples, aspects of the operations of 1020 may be performed by a mapping manager 745 as described with reference to FIG. 7.

At 1025, the method may include blending the motion region in accordance with determining whether at least a portion of the motion region overlaps the highlight region. The operations of 1025 may be performed in accordance with examples as disclosed herein. In some examples, aspects of the operations of 1025 may be performed by a blending manager 735 as described with reference to FIG. 7.

At 1030, the method may include incorporating the blending of the motion region in a set of full resolution frames. The operations of 1030 may be performed in accordance with examples as disclosed herein. In some examples, aspects of the operations of 1030 may be performed by a fusing manager 740 as described with reference to FIG. 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for image processing at a device, comprising: capturing from a sensor of the device a downscaled first frame of a first exposure length and a downscaled second frame of a second exposure length that is longer than the first exposure length; identifying a highlight region associated with the downscaled first frame and a motion region associated with the downscaled first frame and with the downscaled second frame; blending the motion region in accordance with determining whether at least a portion of the motion region overlaps the highlight region; and incorporating the blending of the motion region in a set of full resolution frames.

Aspect 2: The method of aspect 1, further comprising: generating a highlight map comprising one or more highlight regions identified in the downscaled first frame, wherein the one or more highlight regions include the highlight region; and generating a motion map comprising one or more motion regions identified in the downscaled first frame and in the downscaled second frame, wherein the one or more motion regions include the motion region.

Aspect 3: The method of aspect 2, further comprising: analyzing coordinates of the one or more highlight regions in relation to coordinates of the one or more motion regions; and determining, in accordance with the analyzing, that at least the portion of the motion region overlaps the highlight region.

Aspect 4: The method of aspect 3, further comprising: generating a refined highlight map by adding at least the portion of the motion region that overlaps the highlight region to the highlight map; and generating a refined motion map by removing at least the portion of the motion region that overlaps the highlight region from the motion map.

Aspect 5: The method of aspect 4, wherein the set of full resolution frames comprises a first full resolution frame captured at the first exposure length and a second full resolution frame captured at the second exposure length.

Aspect 6: The method of aspect 5, further comprising: detecting a second highlight region of the first full resolution frame based at least in part on the refined highlight map; and blending the detected highlight region of the first full resolution frame into a portion of the first full resolution frame that surrounds the detected highlight region.

Aspect 7: The method of aspect 6, further comprising: detecting a second motion region of the second full resolution frame based at least in part on the refined motion map; and blending the detected motion region of the second full resolution frame into a portion of the second full resolution frame that surrounds the detected motion region.

Aspect 8: The method of aspect 7, further comprising: fusing, after the blending of the detected highlight region and the detected motion region, the first full resolution frame with the second full resolution frame.

Aspect 9: The method of any of aspects 1 through 8, wherein capturing the downscaled first frame and the downscaled second frame comprises: capturing the downscaled first frame at a first resolution that is less than a full resolution of the sensor; and capturing the downscaled second frame at a second resolution that is the same or less than the first resolution.

Aspect 10: The method of aspect 9, further comprising. capturing the set of full resolution frames at the full resolution of the sensor Aspect 11: An apparatus for image processing at a device, comprising a processor; memory coupled with the processor; and instructions stored in the memory and executable by the processor to cause the apparatus to perform a method of any of aspects 1 through 10.

Aspect 12: An apparatus for image processing at a device, comprising at least one means for performing a method of any of aspects 1 through 10.

Aspect 13: A non-transitory computer-readable medium storing code for image processing at a device, the code comprising instructions executable by a processor to perform a method of any of aspects 1 through 10.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
    capturing from a sensor of the device a downscaled first frame of a first exposure length and a downscaled second frame of a second exposure length that is longer than the first exposure length;
    identifying a highlight region associated with the downscaled first frame and a motion region associated with the downscaled first frame and with the downscaled second frame;
    blending the motion region in accordance with determining whether at least a portion of the motion region overlaps the highlight region; and
    incorporating the blending of the motion region in a set of full resolution frames.

2. The method of claim 1, further comprising:
    generating a highlight map comprising one or more highlight regions identified in the downscaled first frame, wherein the one or more highlight regions include the highlight region; and
    generating a motion map comprising one or more motion regions identified in the downscaled first frame and in the downscaled second frame, wherein the one or more motion regions include the motion region.

3. The method of claim 2, further comprising:
    analyzing coordinates of the one or more highlight regions in relation to coordinates of the one or more motion regions; and
    determining, in accordance with the analyzing, that at least the portion of the motion region overlaps the highlight region.

4. The method of claim 3, further comprising:
    generating a refined highlight map by adding at least the portion of the motion region that overlaps the highlight region to the highlight map; and
    generating a refined motion map by removing at least the portion of the motion region that overlaps the highlight region from the motion map.

5. The method of claim 4, wherein the set of full resolution frames comprises a first full resolution frame captured at the first exposure length and a second full resolution frame captured at the second exposure length.

6. The method of claim 5, further comprising:
    detecting a second highlight region of the first full resolution frame based at least in part on the refined highlight map; and
    blending the detected highlight region of the first full resolution frame into a portion of the first full resolution frame that surrounds the detected highlight region.

7. The method of claim 6, further comprising:
    detecting a second motion region of the second full resolution frame based at least in part on the refined motion map; and
    blending the detected motion region of the second full resolution frame into a portion of the second full resolution frame that surrounds the detected motion region.

8. The method of claim 7, further comprising:
    fusing, after the blending of the detected highlight region and the detected motion region, the first full resolution frame with the second full resolution frame.

9. The method of claim 1, wherein capturing the downscaled first frame and the downscaled second frame comprises:
    capturing the downscaled first frame at a first resolution that is less than a full resolution of the sensor; and
    capturing the downscaled second frame at a second resolution that is the same or less than the first resolution.

10. The method of claim 9, further comprising:
    capturing the set of full resolution frames at the full resolution of the sensor.

11. An apparatus for image processing at a device, comprising:
    a processor;
    memory coupled with the processor; and
    instructions stored in the memory and executable by the processor to cause the apparatus to:

capture from a sensor of the device a downscaled first frame of a first exposure length and a downscaled second frame of a second exposure length that is longer than the first exposure length;

identify a highlight region associated with the downscaled first frame and a motion region associated with the downscaled first frame and with the downscaled second frame;

blend the motion region in accordance with determining whether at least a portion of the motion region overlaps the highlight region; and incorporate the blending of the motion region in a set of full resolution frames.

12. The apparatus of claim 11, wherein the instructions are further executable by the processor to cause the apparatus to:

generate a highlight map comprising one or more highlight regions identified in the downscaled first frame, wherein the one or more highlight regions include the highlight region; and generate a motion map comprising one or more motion regions identified in the downscaled first frame and in the downscaled second frame, wherein the one or more motion regions include the motion region.

13. The apparatus of claim 12, wherein the instructions are further executable by the processor to cause the apparatus to:

analyze coordinates of the one or more highlight regions in relation to coordinates of the one or more motion regions; and determine, in accordance with the analyzing, that at least the portion of the motion region overlaps the highlight region.

14. The apparatus of claim 13, wherein the instructions are further executable by the processor to cause the apparatus to:

generate a refined highlight map by adding at least the portion of the motion region that overlaps the highlight region to the highlight map; and generate a refined motion map by removing at least the portion of the motion region that overlaps the highlight region from the motion map.

15. The apparatus of claim 14, wherein the set of full resolution frames comprises a first full resolution frame captured at the first exposure length and a second full resolution frame captured at the second exposure length.

16. The apparatus of claim 15, wherein the instructions are further executable by the processor to cause the apparatus to:

detect a second highlight region of the first full resolution frame based at least in part on the refined highlight map; and blend the detected highlight region of the first full resolution frame into a portion of the first full resolution frame that surrounds the detected highlight region.

17. The apparatus of claim 16, wherein the instructions are further executable by the processor to cause the apparatus to:

detect a second motion region of the second full resolution frame based at least in part on the refined motion map; and blend the detected motion region of the second full resolution frame into a portion of the second full resolution frame that surrounds the detected motion region.

18. The apparatus of claim 17, wherein the instructions are further executable by the processor to cause the apparatus to:

fuse, after the blending of the detected highlight region and the detected motion region, the first full resolution frame with the second full resolution frame.

19. An apparatus for image processing at a device, comprising:

means for capturing from a sensor of the device a downscaled first frame of a first exposure length and a downscaled second frame of a second exposure length that is longer than the first exposure length;

means for identifying a highlight region associated with the downscaled first frame and a motion region associated with the downscaled first frame and with the downscaled second frame;

means for blending the motion region in accordance with determining whether at least a portion of the motion region overlaps the highlight region; and means for incorporating the blending of the motion region in a set of full resolution frames.

20. The apparatus of claim 19, further comprising:

means for generating a highlight map comprising one or more highlight regions identified in the downscaled first frame, wherein the one or more highlight regions include the highlight region; and means for generating a motion map comprising one or more motion regions identified in the downscaled first frame and in the downscaled second frame, wherein the one or more motion regions include the motion region.

21. A method for image processing at a device, comprising:

capturing from a sensor of the device a downscaled first frame of a first exposure length and a downscaled second frame of a second exposure length that is longer than the first exposure length;

identifying a highlight region associated with the downscaled first frame and a motion region associated with the downscaled first frame and with the downscaled second frame;

blending the motion region in accordance with determining whether at least a portion of the motion region overlaps the highlight region; and incorporating the blending of the motion region in a set of full resolution frames.

22. The method of claim 21, further comprising:

generating a highlight map comprising one or more highlight regions identified in the downscaled first frame, wherein the one or more highlight regions include the highlight region; and generating a motion map comprising one or more motion regions identified in the downscaled first frame and in the downscaled second frame, wherein the one or more motion regions include the motion region.

23. The method of claim 22, further comprising:

analyzing coordinates of the one or more highlight regions in relation to coordinates of the one or more motion regions; and determining, in accordance with the analyzing, that at least the portion of the motion region overlaps the highlight region.

24. The method of claim 23, further comprising:

generating a refined highlight map by adding at least the portion of the motion region that overlaps the highlight region to the highlight map; and generating a refined motion map by removing at least the portion of the motion region that overlaps the highlight region from the motion map.

25. The method of claim 24, wherein:

the set of full resolution frames comprises a first full resolution frame captured at the first exposure length and a second full resolution frame captured at the second exposure length.

26. The method of claim 25, further comprising:

detecting a second highlight region of the first full resolution frame based at least in part on the refined highlight map; and blending the detected highlight region of the first full resolution frame into a portion of the first full resolution frame that surrounds the detected highlight region.

27. The method of claim 26, further comprising:

detecting a second motion region of the second full resolution frame based at least in part on the refined motion map; and blending the detected motion region of the second full resolution frame into a portion of the second full resolution frame that surrounds the detected motion region.

28. The method of claim 27, further comprising:

fusing, after the blending of the detected highlight region and the detected motion region, the first full resolution frame with the second full resolution frame.

29. The method of any of claims 21 through 28, wherein capturing the downscaled first frame and the downscaled second frame comprises:

capturing the downscaled first frame at a first resolution that is less than a full resolution of the sensor; and capturing the downscaled second frame at a second resolution that is the same or less than the first resolution.

30. The method of claim 29, further comprising:

capturing the set of full resolution frames at the full resolution of the sensor.

* * * * *